(12) United States Patent
Thirion et al.

(10) Patent No.: US 10,047,607 B2
(45) Date of Patent: Aug. 14, 2018

(54) WELDED SHAFT AND TURBINE WHEEL ASSEMBLY

(71) Applicant: Honeywell International Inc., Morristown, NJ (US)

(72) Inventors: Michel Maurice Thirion, Epinal (FR); Brent Zollinger, Torrance, CA (US); Nicolas Vazeille, Bainville aux Miroirs (FR); Marc Wilson, Thaon les Vosges (FR); Didier Horlaville, Laneuveville devant Nancy (FR); Dominique Armand, Uxegney (FR); Andrei Minculescu, Bucharest (RO)

(73) Assignee: Honeywell International Inc., Morris Plains, NJ (US)

( * ) Notice: Subject to any disclaimer, the term of this patent is extended or adjusted under 35 U.S.C. 154(b) by 597 days.

(21) Appl. No.: 14/097,330

(22) Filed: Dec. 5, 2013

(65) Prior Publication Data
US 2015/0159487 A1    Jun. 11, 2015

(51) Int. Cl.
*F01D 5/02* (2006.01)
*F16D 1/027* (2006.01)
(Continued)

(52) U.S. Cl.
CPC .............. *F01D 5/025* (2013.01); *F01D 5/063* (2013.01); *F16D 1/027* (2013.01); *F02C 6/12* (2013.01);
(Continued)

(58) Field of Classification Search
CPC .... F01D 5/063; F01D 5/025; F05D 2230/233; F05D 2230/234; F05D 2220/40;
(Continued)

(56) References Cited

U.S. PATENT DOCUMENTS 4,063,062 A * 12/1977 Kuhnen ................. F01D 5/063
219/121.14
4,794,231 A    12/1988 Banas et al.
(Continued)

FOREIGN PATENT DOCUMENTS

CN    101480760 A * 7/2009
EP      1712324 A1   10/2006
(Continued)

OTHER PUBLICATIONS

EPO, Translation of JP2011-112039A, retrieved Apr. 12, 2017.*
(Continued)

*Primary Examiner* — Jason Shanske
*Assistant Examiner* — Jesse Prager
(74) *Attorney, Agent, or Firm* — Brian J. Pangrle

(57) ABSTRACT

A component for a turbocharger can include a shaft made of a first material where the shaft includes a turbine wheel end and a shaft axis; a turbine wheel made of a second material where the turbine wheel includes a shaft end and a turbine wheel axis; a weld joint formed by solidification of at least a portion of a weld pool that includes the first material and the second material, where the weld joint joins the turbine wheel end of the shaft and the shaft end of the turbine wheel and where the weld joint includes an inner radial border and an outer radial border; a reservoir disposed radially inwardly of the inner radial border of the weld joint; and a solidified portion of the weld pool disposed in the reservoir. Various other examples of devices, assemblies, systems, methods, etc., are also disclosed.

14 Claims, 12 Drawing Sheets

(51) Int. Cl.
*F01D 5/06* (2006.01)
*F02C 6/12* (2006.01)

(52) U.S. Cl.
CPC .... *F05D 2220/40* (2013.01); *F05D 2230/234* (2013.01)

(58) Field of Classification Search
CPC .......... F02C 6/12; F16D 1/027; B23K 37/06; B23K 15/04; B23K 33/00; B23K 33/006
USPC ...................................... 416/244 R
See application file for complete search history.

(56) References Cited

U.S. PATENT DOCUMENTS

| | | | |
|---|---|---|---|
| 4,840,303 | A | 6/1989 | Fuji |
| 7,156,282 | B1 | 1/2007 | Renaud et al. |
| 8,513,841 | B2 * | 8/2013 | Rotzinger ............ B23K 33/006 219/121.14 |
| 2006/0067824 | A1 | 3/2006 | O'Hara |
| 2006/0231531 | A1 | 10/2006 | Burnett et al. |
| 2008/0211339 | A1 | 9/2008 | Rotzinger et al. |
| 2010/0183112 | A1 * | 7/2010 | Ashida .................. B23K 26/28 376/287 |
| 2012/0076639 | A1 | 3/2012 | Vazeille et al. |
| 2013/0272781 | A1 | 10/2013 | Oiwa et al. |
| 2014/0153693 | A1 * | 6/2014 | Nishimoto ............. G01N 23/04 378/58 |

FOREIGN PATENT DOCUMENTS

| | | |
|---|---|---|
| EP | 1719572 A2 | 11/2006 |
| EP | 1964641 A1 | 9/2008 |
| EP | 2434126 A2 | 3/2012 |
| JP | 61273275 A * | 12/1986 |
| JP | H08 90223 A | 4/1996 |
| JP | H08 90233 A | 4/1996 |
| JP | 2011117540 A | 6/2011 |
| JP | 2012057577 A | 3/2012 |
| JP | 2013170487 A * | 9/2013 |

OTHER PUBLICATIONS

EPO, Translation of EP 1,719,572 A2, retrieved Apr. 12, 2017.*
ESPACEnet, translation of CN101480760, retrieved Sep. 6, 2017.*
ESPACEnet, translation of JP2011112039A, retrieved Sep. 8, 2017.*
Lugscheider et al. Thermal and Metallurgical Influences on AISI 216 and Inconel 625 by High Temperature Brazing with Nickel Base Filler Metals, Welding Research Suppl, 1982, p. s329 (5 pages).
EP Application No. 14192572.7-1610, Search Report dated Apr. 8, 2015 (7 pages).
Verhaeghe et al., The effect of spot size and laser beam quality on welding performance when using high-power continuous wave solid-state lasers, ICAELEO 2005, Oct. 31-Nov 4, 2005, Miami, Florida, USA Paper #511 (11 pages).

* cited by examiner

WELDED SHAFT AND TURBINE WHEEL ASSEMBLY

TECHNICAL FIELD

Subject matter disclosed herein relates generally to turbomachinery for internal combustion engines and, in particular, to shaft and turbine wheel assemblies.

BACKGROUND

Most conventional turbochargers include a shaft fixed to a turbine wheel, which is often referred to as a shaft and turbine wheel assembly (SWA). During assembly of a turbocharger, the shaft of a SWA is usually inserted through a bearing bore of a center housing such that the free end of the shaft can be fitted with a compressor wheel.

As operational environments of a compressor wheel, a shaft and a turbine wheel differ, materials of construction and manners of construction of these components can also differ. For example, exhaust temperatures may exceed 500 degrees C. for a diesel engine and 1000 degrees C. for a gasoline engine thereby requiring high-temperature materials for turbine wheel construction. Further, while a shaft may be made of a moderate temperature resistant metal or metal alloy turned on a lathe, a turbine wheel is typically cast using a high-temperature resistant ceramic, metal or metal alloy (e.g., consider austenitic nickel-chromium-based superalloys marketed under the brand INCONEL®, Special Metals Corporation, Huntington W. Va.).

Various techniques can be used to join a shaft to a turbine wheel. One technique is electron beam welding, which involves placing a shaft and turbine wheel in a vacuum and focusing an electron beam on a joint to be welded. Another energy beam-based technique involves one or more laser beams to deliver energy sufficient to weld components together. Other techniques include, for example, friction welding where one component is rotated and contacted with another component to generate heat that causes melting of material. In general, it is beneficial for a weld to be formed in a manner that requires minimal post-weld machining. It is also beneficial for a weld to be formed in a manner that does not introduce excessive stresses.

Overall, a SWA should be able to withstand temperature variations and centrifugal loading without experiencing significant deformation (e.g., which could alter balance, introduce noise, reduce assembly life, etc.). As described in various examples herein, various components, assemblies and techniques may improve SWA quality and turbocharger performance.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1:
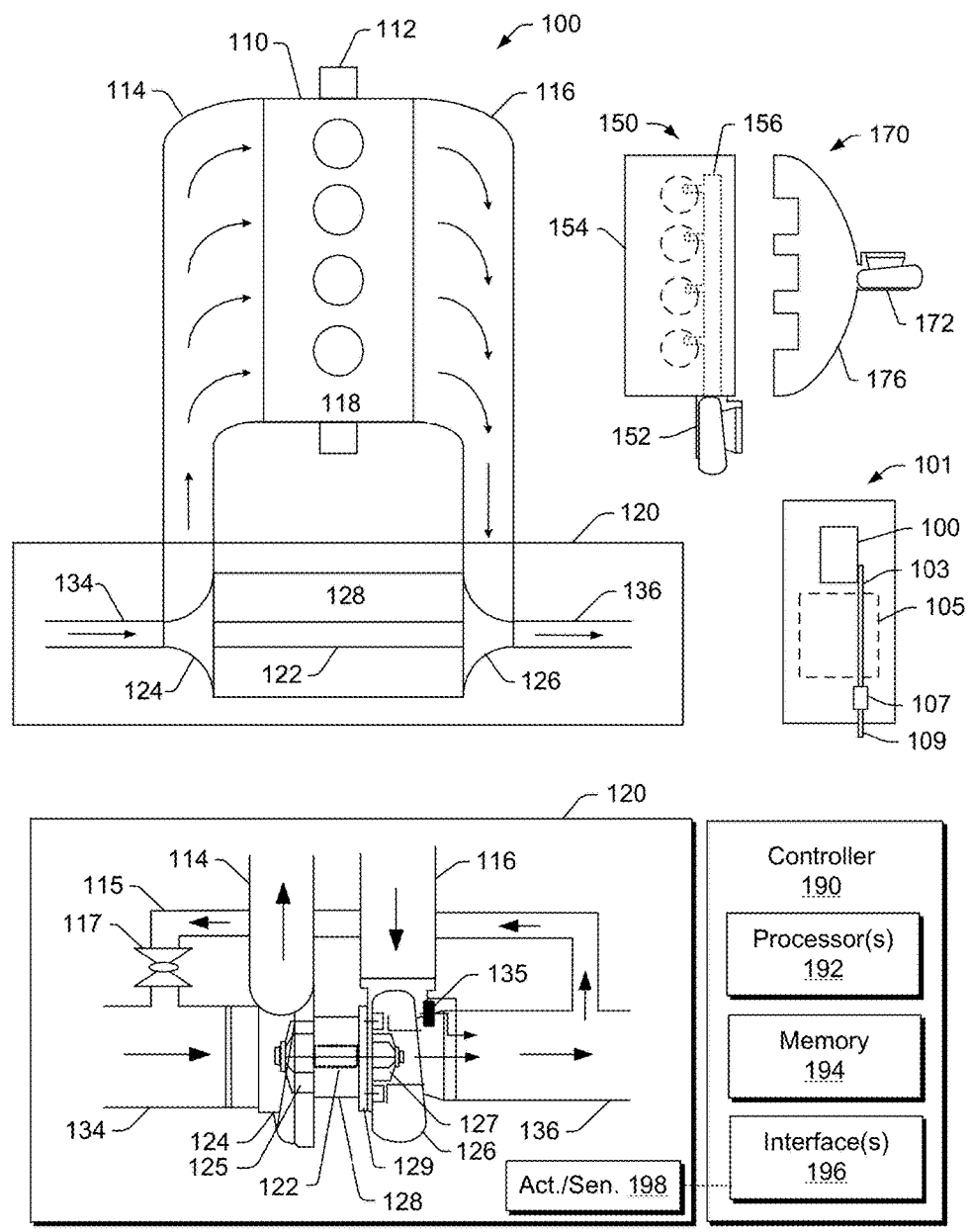
FIG. 1 is a diagram of a turbocharger and an internal combustion engine.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing 128 may be referred to as a center housing assembly as it is disposed between the compressor housing assembly 124 and the turbine housing assembly 126. The shaft 122 may be a shaft assembly that includes a variety of components. As an example, the shaft 122 may be joined to the turbine wheel 127, for example, via a weld joint, to form a shaft and wheel assembly (SWA).

In the example of FIG. 1, the shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc.

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Figure 2:
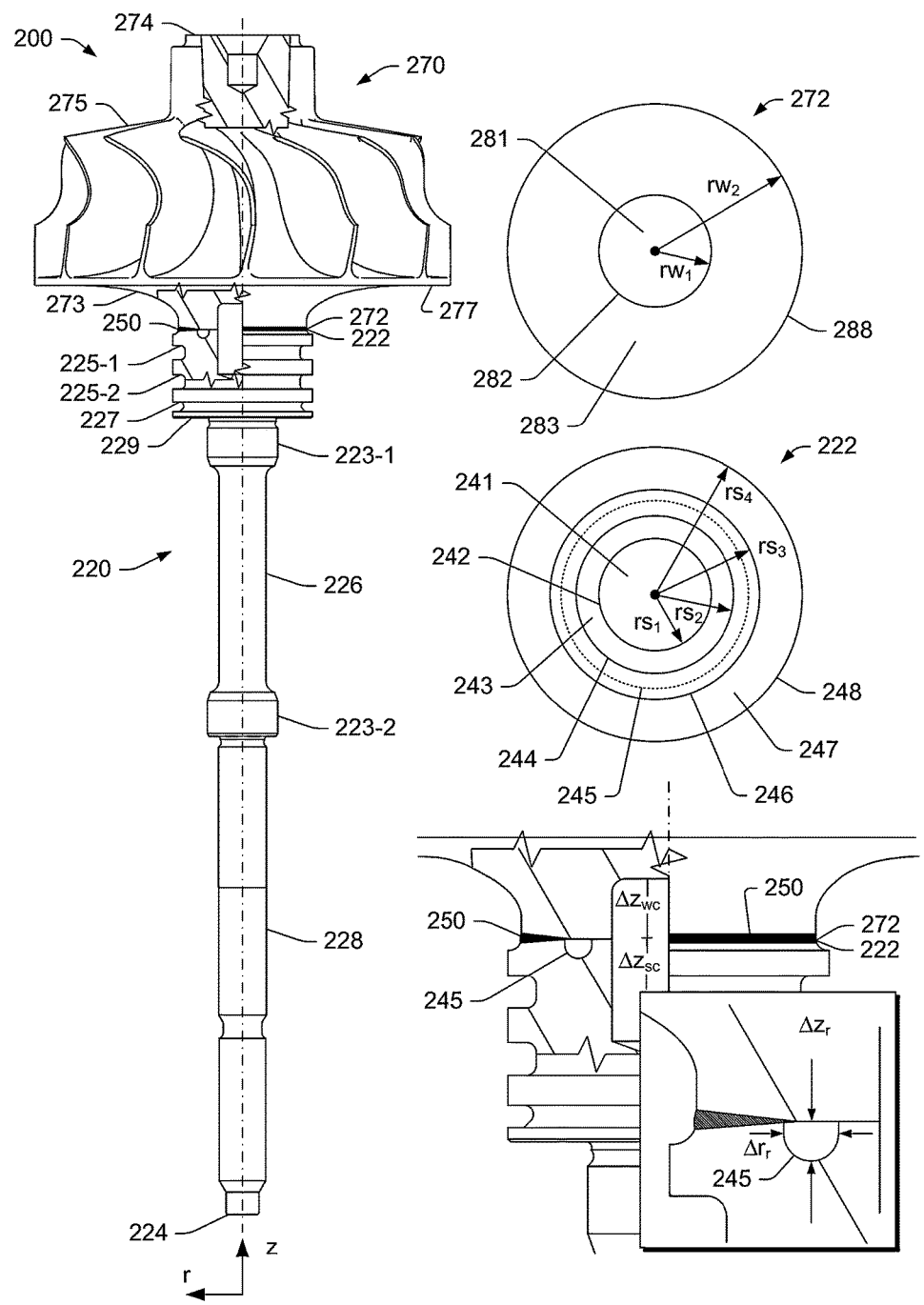
FIG. 2 is a series of views of an example of a shaft and wheel assembly for a turbocharger.

FIG. 2 shows an example of a shaft and wheel assembly (SWA) 200 that includes a shaft 220 and a turbine wheel 270. In the example of FIG. 2, the shaft 220 includes a turbine end 222 and a compressor end 224 with various features between these two opposing ends. For example, the shaft 220 includes journal surfaces 223-1 and 223-2, which may be specified by a diameter or diameters and an axial length or axial lengths. The shaft 220 may include a neck portion 226 disposed between the journal surfaces 223-1 and 223-2. As shown in the example of FIG. 2, the shaft 220 includes a shoulder at an edge of the journal surface 223-2 that steps down to a smaller diameter compressor portion 228 of the shaft 220. As an example, the compressor portion 228 may be for a compressor wheel with a through bore or for a compressor wheel with a partial bore, sometimes referred to as a boreless compressor wheel. As another example, a shaft may include a recess for receipt of an extension of a compressor wheel (e.g., a threaded recess for receipt of a threaded extension, etc.).

In the example of FIG. 2, the shaft 220 includes at least one annular groove 225-1 and 225-2, a shoulder 227 and an axial face 229. As an example, the at least one annular groove 225-1 and 225-2 may be configured for receipt of one or more seal elements such as, for example, one or more piston rings. During operation, a seal element may act to seal a center housing space from a turbine assembly space, for example, as to reduce transfer of exhaust, lubricant, etc. between such spaces.

In the example of FIG. 2, the turbine wheel 270 includes a shaft end 272 and a free end 274 with blades 275 disposed therebetween as extending radially outwardly from a hub and integral with a so-called backplate 277 that tapers along a contoured hub surface 273 to the shaft end 272.

As an example, a turbine wheel may be characterized in part by a relationship between an inducer portion of the turbine wheel and an exducer portion of the turbine wheel where the inducer portion is configured as an inlet for exhaust (e.g., leading edges of blades) and where the exducer portion is configured as an outlet for exhaust (e.g., trailing edges of blades). In the example of FIG. 2, the inducer portion of the turbine wheel 270 includes leading edges of the blades 275, which extend mainly in an axial direction and are disposed at a diameter approximately equal to the maximum diameter of the turbine wheel 270 while the exducer portion of the turbine wheel 270 includes trailing edges of the blades 275, which extend mainly in a radial direction with a maximum diameter that is less than the maximum diameter of the turbine wheel 270. During operation, where the turbine wheel 270 is joined to the shaft 220 to form the SWA 200, as part of a turbocharger, exhaust flows from the inducer portion to the exducer portion of the turbine wheel 270 (e.g., to drive the turbine wheel 270 toward the right in FIG. 2).

In the example of FIG. 2, a weld joint 250 is illustrated as being a substantially annular joint that joins the shaft 220 and the turbine wheel 270, for example, at the turbine wheel end 222 of the shaft 220 and the shaft end 272 of the turbine wheel 270.

FIG. 2 shows a plan view of the turbine wheel end 222 of the shaft 220 and a plan view of the shaft end 272 of the turbine wheel 270 along with radial dimensions defined with respect to an axis of the shaft 220 and an axis of the turbine wheel 270, which may be substantially aligned.

In the example of FIG. 2, the shaft end 272 of the turbine wheel 270 includes a cavity wall 281 (e.g., at a depth $\Delta z_{wc}$), an edge 282 at an inner radial dimension $rw_1$, an annular face 283 and an edge 288 at an outer radial dimension $rw_2$. As an example, the annular face 283 may be flat and in a plane where the axis of the turbine wheel 270 is normal to the plane.

In the example of FIG. 2, the turbine wheel end 222 of the shaft 220 includes a cavity wall 241 (e.g., at a depth $\Delta z_{sc}$), an edge 242 at an inner radial dimension $rs_1$, an annular face 243, an edge 244 at an intermediate radial dimension $rs_2$, a reservoir 245 with a radial width $\Delta r_r$ and an axial depth $\Delta z_r$, an edge 246 at an intermediate radial dimension $rs_3$, an annular face 247 and an edge 248 at an outer radial dimension $rs_4$. As an example, the annular face 243 may be flat and in a plane where the axis of the shaft 220 is normal to the plane. As an example, the annular face 247 may be flat and in a plane where the axis of the shaft 220 is normal to the plane.

As shown in the example of FIG. 2, the annular face 283 of the turbine wheel 270 is joined to the annular face 247 of the shaft 220 via the weld joint 250. As an example, during a welding process, molten material may flow to the reservoir 245. In such an example, the reservoir 245 may at least partially fill with molten material. As an example, such material may be material of the shaft 220 and/or material of the turbine wheel 270. As an example, a welding process may include laser welding.

In the example of FIG. 2, the edge 246 may be an edge of the reservoir 245 and located an appropriate radial distance from the edge 248, for example, based at least in part on a welding process, desired weld integrity (e.g., with respect to performance conditions, operational conditions, etc.), etc. As an example, the reservoir 245 may have a volume, for example, defined by its radial and axial dimensions and shape. For example, in FIG. 2, the reservoir 245 is illustrated as having a rounded profile. In particular, a reservoir may have a profile that acts to flow molten material to a particular location in the reservoir, which may be, for example, away from an edge of the reservoir (e.g., an outer edge such as the edge 246 of the reservoir 245).

In the example of FIG. 2, the radial dimensions $rs_1$ and $rw_1$ may be approximately equal and/or the radial dimensions $rs_4$ and $rw_2$ may be approximately equal. As shown in a cutaway view in FIG. 2, where such dimensions are approximately equal, where axes are aligned, the edges may likewise align.

As an example, a tool may align a shaft and a turbine wheel with respect to their respective axes and then a welder may be provided for emission of energy to weld the shaft and the turbine wheel to form a shaft and wheel assembly (SWA). In such an example, energy provided by the welder may cause material of the shaft and material of the turbine wheel to melt (e.g., change phase) and to flow (e.g., optionally depending on force and/or position imparted by an alignment tool, etc.). After deposition of energy from a welder, molten material may cool and solidify to form a weld joint. In such an example, molten material may have flowed to a reservoir where, upon cooling and solidification, the reservoir may now contain some material. As an example, a reservoir may remain empty, may become partially filled or may become completely filled. For example, where welding melts a minimal amount of material, such material may remain between two faces without flowing to a reservoir; whereas, if more material is melted, such material may flow to the reservoir.

As an example, a reservoir may be provided intermediate reservoir edges for capturing molten material stemming from a welding process that forms a weld joint between a shaft and a turbine wheel. As an example, a reservoir may be disposed intermediate a cavity and an outer edge of a shaft or a turbine wheel. As an example, a reservoir may include a maximum depth that is located closer to one reservoir edge than another reservoir edge. As an example, a reservoir may include a profile that promotes flow of molten material from a reservoir edge toward a deepest point of the reservoir. As an example, a maximum depth may be located closer to an outer radial edge than an inner radial edge of a reservoir. As an example, a reservoir may include a profile such that upon filling, cross-sectional area and hence volume of the reservoir increases in a direction from maximum axial depth to an edge of the reservoir.

As an example, a reservoir may be sealed, for example, to trap material that may have flowed into the reservoir during a welding process. For example, where the annular faces 243 and 247 are substantially even (with respect to axial position) and where the annular face 283 is substantially flat, upon welding and formation of a weld joint, material may become trapped in the reservoir 245 (e.g., unable to migrate toward a cavity (e.g., of the turbine wheel 270, of the shaft 220, etc.). In the example of FIG. 2, the turbine wheel 270 and the shaft 220 are shown as including central cavities, for example, disposed along respective longitudinal axes of the turbine wheel 270 and the shaft 220. Material that may flow to such a central cavity may be at risk of becoming dislodged, for example, due to heat, force (e.g., at high rpm), etc. As an example, such material if dislodged may move and possibly impact balance of a SWA and performance of a turbocharger. As mentioned, a reservoir may act to contain material, which may help to avoid material from entering a central cavity (e.g., or central cavities).

Figure 3:
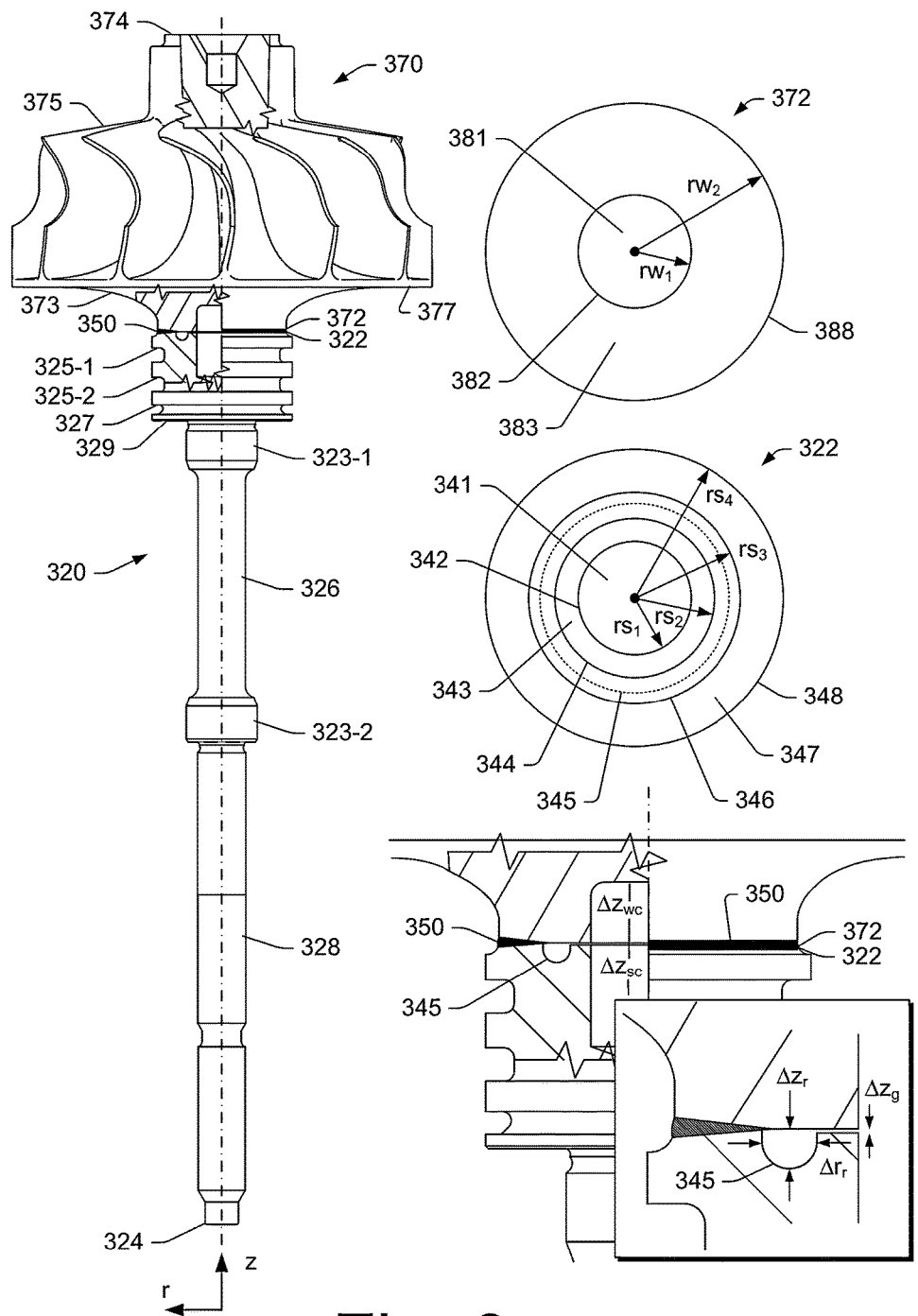
FIG. 3 is a series of views of an example of a shaft and wheel assembly for a turbocharger.

FIG. 3 shows an example of a shaft and wheel assembly (SWA) 300 that includes a shaft 320 and a turbine wheel 370. In the example of FIG. 3, the shaft 320 includes a turbine end 322 and a compressor end 324 with various features between these two opposing ends. For example, the shaft 320 includes journal surfaces 323-1 and 323-2, which may be specified by a diameter or diameters and an axial length or axial lengths. The shaft 320 may include a neck portion 326 disposed between the journal surfaces 323-1 and 323-2. As shown in the example of FIG. 3, the shaft 320 includes a shoulder at an edge of the journal surface 323-2 that steps down to a smaller diameter compressor portion 328 of the shaft 320. As an example, the compressor portion 328 may be for a compressor wheel with a through bore or for a compressor wheel with a partial bore, sometimes referred to as a boreless compressor wheel. As another example, a shaft may include a recess for receipt of an extension of a compressor wheel (e.g., a threaded recess for receipt of a threaded extension, etc.).

In the example of FIG. 3, the shaft 320 includes at least one annular groove 325-1 and 325-2, a shoulder 327 and an axial face 329. As an example, the at least one annular groove 325-1 and 325-2 may be configured for receipt of one or more seal elements such as, for example, one or more piston rings. During operation, a seal element may act to seal a center housing space from a turbine assembly space, for example, as to reduce transfer of exhaust, lubricant, etc. between such spaces.

In the example of FIG. 3, the turbine wheel 370 includes a shaft end 372 and a free end 374 with blades 375 disposed therebetween as extending radially outwardly from a hub and integral with a so-called backplate 377 that tapers along a contoured hub surface 373 to the shaft end 372.

As an example, a turbine wheel may be characterized in part by a relationship between an inducer portion of the turbine wheel and an exducer portion of the turbine wheel where the inducer portion is configured as an inlet for exhaust (e.g., leading edges of blades) and where the exducer portion is configured as an outlet for exhaust (e.g., trailing edges of blades). In the example of FIG. 3, the inducer portion of the turbine wheel 370 includes leading edges of the blades 375, which extend mainly in an axial direction and are disposed at a diameter approximately equal to the maximum diameter of the turbine wheel 370 while the exducer portion of the turbine wheel 370 includes trailing edges of the blades 375, which extend mainly in a radial direction with a maximum diameter that is less than the maximum diameter of the turbine wheel 370. During operation, where the turbine wheel 370 is joined to the shaft 320 to form the SWA 300, as part of a turbocharger, exhaust flows from the inducer portion to the exducer portion of the turbine wheel 370 (e.g., to drive the turbine wheel 370 toward the right in FIG. 3).

In the example of FIG. 3, a weld joint 350 is illustrated as being a substantially annular joint that joins the shaft 320 and the turbine wheel 370, for example, at the turbine wheel end 322 of the shaft 320 and the shaft end 372 of the turbine wheel 370.

FIG. 3 shows a plan view of the turbine wheel end 322 of the shaft 320 and a plan view of the shaft end 372 of the turbine wheel 370 along with radial dimensions defined with respect to an axis of the shaft 320 and an axis of the turbine wheel 370, which may be substantially aligned.

In the example of FIG. 3, the shaft end 372 of the turbine wheel 370 includes a cavity wall 381 (e.g., at a depth $\Delta z_{wc}$), an edge 382 at an inner radial dimension $rw_1$, an annular face 383 and an edge 388 at an outer radial dimension $rw_2$. As an example, the annular face 383 may be flat and in a plane where the axis of the turbine wheel 370 is normal to the plane.

In the example of FIG. 3, the turbine wheel end 322 of the shaft 320 includes a cavity wall 341 (e.g., at a depth $\Delta z_{sc}$), an edge 342 at an inner radial dimension $rs_1$, an annular face 343, an edge 344 at an intermediate radial dimension $rs_2$, a reservoir 345 with a radial width $\Delta r_r$ and an axial depth $\Delta z_r$, an edge 346 at an intermediate radial dimension $rs_3$, an annular face 347 and an edge 348 at an outer radial dimension $rs_4$. As an example, the annular face 343 may be flat and in a plane where the axis of the shaft 320 is normal to the plane. As an example, the annular face 347 may be flat and in a plane where the axis of the shaft 320 is normal to the plane.

As shown in the example of FIG. 3, the annular face 383 of the turbine wheel 370 is joined to the annular face 347 of the shaft 320 via the weld joint 350. As an example, during a welding process, molten material may flow to the reservoir 345. In such an example, the reservoir 345 may at least partially fill with molten material. As an example, such material may be material of the shaft 320 and/or material of the turbine wheel 370. As an example, a welding process may include laser welding.

In the example of FIG. 3, the edge 346 may be an edge of the reservoir 345 and located an appropriate radial distance from the edge 348, for example, based at least in part on a welding process, desired weld integrity (e.g., with respect to performance conditions, operational conditions, etc.), etc. As an example, the reservoir 345 may have a volume, for example, defined by its radial and axial dimensions and shape. For example, in FIG. 3, the reservoir 345 is illustrated as having a rounded profile. In particular, a reservoir may have a profile that acts to flow molten material to a particular location in the reservoir, which may be, for example, away from an edge of the reservoir (e.g., an outer edge such as the edge 346 of the reservoir 345).

In the example of FIG. 3, the radial dimensions $rs_1$ and $rw_1$ may be approximately equal and/or the radial dimensions $rs_4$ and $rw_2$ may be approximately equal. As shown in a cutaway view in FIG. 3, where such dimensions are approximately equal, where axes are aligned, the edges may likewise align.

As an example, a tool may align a shaft and a turbine wheel with respect to their respective axes and then a welder may be provided for emission of energy to weld the shaft and the turbine wheel to form a shaft and wheel assembly (SWA). In such an example, energy provided by the welder may cause material of the shaft and material of the turbine wheel to melt (e.g., change phase) and to flow (e.g., optionally depending on force and/or position imparted by an alignment tool, etc.). After deposition of energy from a welder, molten material may cool and solidify to form a weld joint. In such an example, molten material may have flowed to a reservoir where, upon cooling and solidification, the reservoir may now contain some material. As an example, a reservoir may remain empty, may become partially filled or may become completely filled. For example, where welding melts a minimal amount of material, such material may remain between two faces without flowing to a reservoir; whereas, if more material is melted, such material may flow to the reservoir.

As an example, a reservoir may be provided intermediate reservoir edges for capturing molten material stemming from a welding process that forms a weld joint between a shaft and a turbine wheel. As an example, a reservoir may be disposed intermediate a cavity and an outer edge of a shaft or a turbine wheel. As an example, a reservoir may include a maximum depth that is located closer to one reservoir edge than another reservoir edge. As an example, a reservoir may include a profile that promotes flow of molten material from a reservoir edge toward a deepest point of the reservoir. As an example, a maximum depth may be located closer to an outer radial edge than an inner radial edge of a reservoir. As an example, a reservoir may include a profile such that upon filling, cross-sectional area and hence volume of the reservoir increases in a direction from maximum axial depth to an edge of the reservoir.

As an example, a reservoir may be sealed, for example, to trap material that may have flowed into the reservoir during a welding process. For example, where the annular faces 343 and 347 are substantially even (with respect to axial position) and where the annular face 383 is substantially flat, upon welding and formation of a weld joint, material may become trapped in the reservoir 345 (e.g., unable to migrate toward a cavity (e.g., of the turbine wheel 370, of the shaft 320, etc.). In the example of FIG. 3, the turbine wheel 370 and the shaft 320 are shown as including central cavities, for example, disposed along respective longitudinal axes of the turbine wheel 370 and the shaft 320.

In the example of FIG. 3, the axial position of the annular face 343 is less than the axial position of the annular face 347, for example, by a gap amount $\Delta z_g$. In such an example, where molten material fills or otherwise traverses the reservoir 345, such material may flow into the gap disposed between the annular face 383 of the turbine wheel 370 and the annular face 343 of the shaft 320. As an example, such a gap may be considered a reservoir overflow volume. As an example, a reservoir overflow volume may help to avoid flow or migration of material to a central cavity, where such material may be at risk of becoming dislodged, for example, due to heat, force (e.g., at high rpm), etc. As an example, such material if dislodged may move and possibly impact balance of a SWA and performance of a turbocharger. As mentioned, a reservoir may act to contain material, which may help to avoid material from entering a central cavity (e.g., or central cavities).

As an example, where the axial position of the annular face 343 is less than the axial position of the annular face 347, for example, by a gap amount $\Delta z_g$, expansion of material during heating, contraction of material during cooling, etc. may occur in a manner where the gap provides a clearance, which may avoid contact of the shaft 320 and the turbine wheel 370 at a region removed from a weld joint region. In such an example, a weld joint formed at a periphery that extends radially inwardly a distance (e.g., or distances) may dictate how a shaft and turbine wheel are joined, for example, without interference between surfaces that are located radially inwardly from a inwardly extending radial extent of the weld joint. Such an approach may facilitate alignment of respective axes of a shaft and a turbine wheel, which, in turn, may improve throughput during manufacture (e.g., fewer rejected SWAs, less demands on balancing corrections, etc.).

Figure 4:
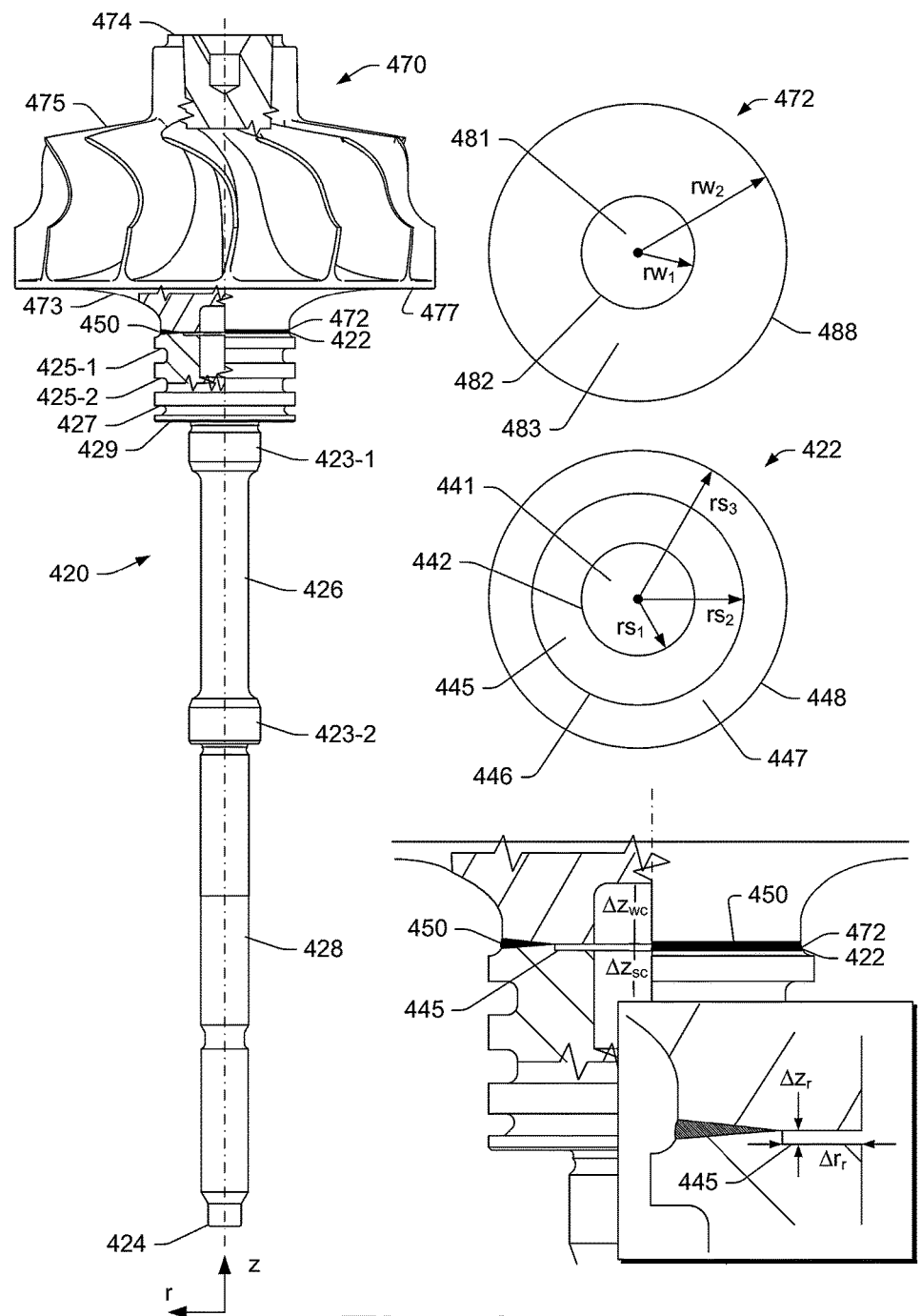
FIG. 4 is a series of views of an example of a shaft and wheel assembly for a turbocharger.

FIG. 4 shows an example of a shaft and wheel assembly (SWA) 400 that includes a shaft 420 and a turbine wheel 470. In the example of FIG. 4, the shaft 420 includes a turbine end 422 and a compressor end 424 with various features between these two opposing ends. For example, the shaft 420 includes journal surfaces 423-1 and 423-2, which may be specified by a diameter or diameters and an axial length or axial lengths. The shaft 420 may include a neck portion 426 disposed between the journal surfaces 423-1 and 423-2. As shown in the example of FIG. 4, the shaft 420 includes a shoulder at an edge of the journal surface 423-2 that steps down to a smaller diameter compressor portion 428 of the shaft 420. As an example, the compressor portion 428 may be for a compressor wheel with a through bore or for a compressor wheel with a partial bore, sometimes referred to as a boreless compressor wheel. As another example, a shaft may include a recess for receipt of an extension of a compressor wheel (e.g., a threaded recess for receipt of a threaded extension, etc.).

In the example of FIG. 4, the shaft 420 includes at least one annular groove 425-1 and 425-2, a shoulder 427 and an axial face 429. As an example, the at least one annular groove 425-1 and 425-2 may be configured for receipt of one or more seal elements such as, for example, one or more piston rings. During operation, a seal element may act to seal a center housing space from a turbine assembly space, for example, as to reduce transfer of exhaust, lubricant, etc. between such spaces.

In the example of FIG. 4, the turbine wheel 470 includes a shaft end 472 and a free end 474 with blades 475 disposed therebetween as extending radially outwardly from a hub and integral with a so-called backplate 477 that tapers along a contoured hub surface 473 to the shaft end 472.

As an example, a turbine wheel may be characterized in part by a relationship between an inducer portion of the turbine wheel and an exducer portion of the turbine wheel where the inducer portion is configured as an inlet for exhaust (e.g., leading edges of blades) and where the exducer portion is configured as an outlet for exhaust (e.g., trailing edges of blades). In the example of FIG. 4, the inducer portion of the turbine wheel 470 includes leading edges of the blades 475, which extend mainly in an axial direction and are disposed at a diameter approximately equal to the maximum diameter of the turbine wheel 470 while the exducer portion of the turbine wheel 470 includes trailing edges of the blades 475, which extend mainly in a radial direction with a maximum diameter that is less than the maximum diameter of the turbine wheel 470. During operation, where the turbine wheel 470 is joined to the shaft 420 to form the SWA 400, as part of a turbocharger, exhaust flows from the inducer portion to the exducer portion of the turbine wheel 470 (e.g., to drive the turbine wheel 470 toward the right in FIG. 4).

In the example of FIG. 4, a weld joint 450 is illustrated as being a substantially annular joint that joins the shaft 420 and the turbine wheel 470, for example, at the turbine wheel end 422 of the shaft 420 and the shaft end 472 of the turbine wheel 470.

FIG. 4 shows a plan view of the turbine wheel end 422 of the shaft 420 and a plan view of the shaft end 472 of the turbine wheel 470 along with radial dimensions defined with respect to an axis of the shaft 420 and an axis of the turbine wheel 470, which may be substantially aligned.

In the example of FIG. 4, the shaft end 472 of the turbine wheel 470 includes a cavity wall 481 (e.g., at a depth $\Delta z_{wc}$), an edge 482 at an inner radial dimension $rw_1$, an annular face 483 and an edge 488 at an outer radial dimension $rw_2$. As an example, the annular face 483 may be flat and in a plane where the axis of the turbine wheel 470 is normal to the plane.

In the example of FIG. 4, the turbine wheel end 422 of the shaft 420 includes a cavity wall 441 (e.g., at a depth $\Delta z_{sc}$), an edge 442 at an inner radial dimension $rs_1$, an open-sided reservoir 445 with a radial width $\Delta r_r$ and an axial depth $\Delta z_r$, an edge 446 at an intermediate radial dimension $rs_2$, an annular face 447 and an edge 448 at an outer radial dimension $rs_3$. As an example, the annular face 447 may be flat and in a plane where the axis of the shaft 420 is normal to the plane.

As shown in the example of FIG. 4, the annular face 483 of the turbine wheel 470 is joined to the annular face 447 of the shaft 420 via the weld joint 450. As an example, during a welding process, molten material may flow to the reservoir 445. In such an example, the reservoir 445 may at least partially fill with molten material. As an example, such material may be material of the shaft 420 and/or material of the turbine wheel 470. As an example, a welding process may include laser welding.

In the example of FIG. 4, the edge 446 may be an edge of the reservoir 445 and located an appropriate radial distance from the edge 448, for example, based at least in part on a welding process, desired weld integrity (e.g., with respect to performance conditions, operational conditions, etc.), etc. As an example, the reservoir 445 may have a volume, for example, defined by its radial and axial dimensions and shape. For example, in FIG. 4, the reservoir 445 is illustrated as having a rectangular profile. As an example, a reservoir may have a profile that acts to flow molten material to a particular location in the reservoir, which may be, for example, away from an edge of the reservoir (e.g., an outer edge such as the edge 446 of the reservoir 445).

In the example of FIG. 4, the radial dimensions $rs_1$ and $rw_1$ may be approximately equal and/or the radial dimensions $rs_3$ and $rw_2$ may be approximately equal. As shown in a cutaway view in FIG. 4, where such dimensions are approximately equal, where axes are aligned, the edges may likewise align.

As an example, a tool may align a shaft and a turbine wheel with respect to their respective axes and then a welder may be provided for emission of energy to weld the shaft and the turbine wheel to form a shaft and wheel assembly (SWA). In such an example, energy provided by the welder may cause material of the shaft and material of the turbine wheel to melt (e.g., change phase) and to flow (e.g., optionally depending on force and/or position imparted by an alignment tool, etc.). After deposition of energy from a welder, molten material may cool and solidify to form a weld joint. In such an example, molten material may have flowed to a reservoir where, upon cooling and solidification, the reservoir may now contain some material. As an example, a reservoir may remain empty, may become partially filled or may become completely filled. For example, where welding melts a minimal amount of material, such material may remain between two faces without flowing to a reservoir; whereas, if more material is melted, such material may flow to the reservoir.

As an example, a reservoir may be provided intermediate reservoir edges for receiving molten material stemming from a welding process that forms a weld joint between a shaft and a turbine wheel. As an example, a reservoir may be disposed intermediate a cavity and an outer edge of a shaft or a turbine wheel. As an example, a reservoir may include a maximum depth that is located closer to one reservoir edge than another reservoir edge. As an example, a reservoir may include a profile that promotes flow of molten material from a reservoir edge toward a deepest point of the reservoir. As an example, a maximum depth may be located closer to an outer radial edge than an inner radial edge of a reservoir. As an example, a reservoir may include a profile such that upon filling, cross-sectional area and hence volume of the reservoir increases in a direction from maximum axial depth to an edge of the reservoir.

As an example, a reservoir may be sealed at one end and open at another end (e.g., an inner end), which may optionally be adjacent to a cavity. In the example of FIG. 4, the turbine wheel 470 and the shaft 420 are shown as including central cavities, for example, disposed along respective longitudinal axes of the turbine wheel 470 and the shaft 420.

In the example of FIG. 4, the axial position of a floor of the reservoir 445 is less than the axial position of the annular face 447, for example, by the reservoir depth amount $\Delta z_r$. In such an example, where molten material fills or otherwise traverses the reservoir 445, such material may flow into a cavity (e.g., or cavities).

As an example, a weld joint formed at a periphery that extends radially inwardly a distance (e.g., or distances) may dictate how a shaft and turbine wheel are joined, for example, without interference between surfaces that are located radially inwardly from a inwardly extending radial extent of the weld joint (e.g., associated with the reservoir 445 and the opposing portion of the annular face 483. Such an approach may facilitate alignment of respective axes of a shaft and a turbine wheel, which, in turn, may improve throughput during manufacture (e.g., fewer rejected SWAs, less demands on balancing corrections, etc.).

Figure 5:
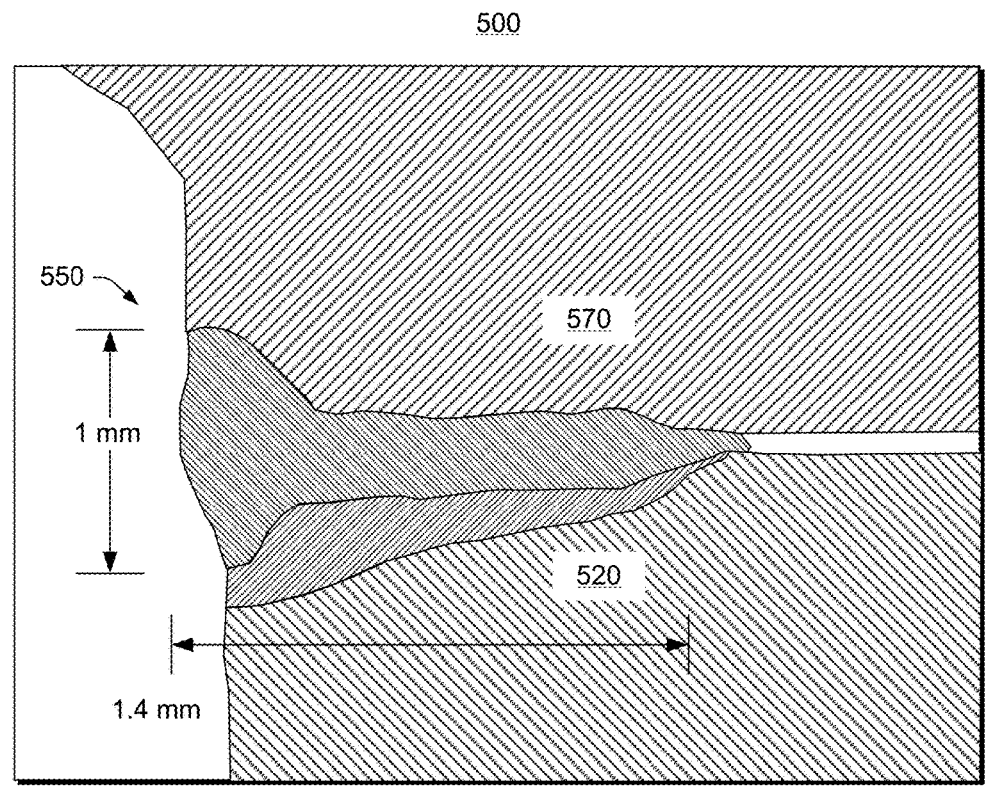
FIG. 5 is an illustration of a cross-sectional view of an example of a shaft and wheel assembly for a turbocharger.

FIG. 5 shows an approximate illustration of an example of a cross-sectional view of a shaft and wheel assembly 500 that includes a shaft portion 520 and a turbine wheel portion 570 joined by a weld joint 550. As shown in the example of FIG. 5, the weld joint 550 may have an axial dimension at an outer extent of about 1 mm and may have a radial dimension of about 1.4 mm. In such an example, a volume of the weld joint may be estimated. As an example, the shaft portion 520 may include features of the shaft 420 of FIG. 4 while the turbine wheel portion 570 may include features of the turbine wheel 470 of FIG. 4. For example, the shaft portion 520 may include the reservoir 425 of FIG. 4, which is shown as being partially filled with material at its outwardly radial extent while being unfilled at its inwardly radial extent.

The approximate illustration of FIG. 5 is based on a photograph of an SWA that was sectioned to expose regions that experience material stresses or weld zones associated with the weld joint 550. Stresses can extend over an axial height and a radial length. In three-dimensions, the stressed material region or weld zone occupies a volume. This volume and its corresponding surfaces may be affected by temperature variations and by centrifugal forces. Such forces may deform the positional relationship between the shaft 520 and the turbine wheel 560 and, in turn, alter balance of the SWA 500.

As an example, a reservoir can receive molten material during a welding process, which, in turn, may help to relieve certain stresses and, for example, reduce the volume of a stressed region associated with a weld joint. In such an example, the reservoir may be an annular reservoir, optionally with an open side (e.g., a side that may open to a cavity that has a volume greater than the reservoir). As an example, a reservoir may be formed by features in an end of a shaft, features in an end of a turbine wheel or features in an end of a shaft and features in an end of a turbine wheel.

As an example, an SWA with a reservoir may maintain balance more readily than an SWA without a reservoir. To demonstrate such differences, gas stand trials may be performed, for example, as to static unbalance for various example SWAs compared to a conventional SWA. As described herein, a reduction in unbalance improves SWA quality, which can improve performance, extend component and turbocharger life and reduce operational noise. Specifically, by reducing thermal and mechanical stresses in a SWA (e.g., due to temperature variation and centrifugal loading), unbalance evolution during service can be reduced, which, in turn, can reduce occurrence of various turbocharger noise issues.

As to examples of welding processes, a welding process may include one or more of electron beam welding, laser welding or other welding technique. A welding process that causes material (e.g., metal, alloy, etc.) to melt and flow during formation of a SWA may benefit from the presence of a reservoir.

As an example, a component for a turbocharger can include a shaft made of a first material where the shaft includes a turbine wheel end and a shaft axis; a turbine wheel made of a second material where the turbine wheel includes a shaft end and a turbine wheel axis; a weld joint formed by solidification of at least a portion of a weld pool that includes the first material and the second material, where the weld joint joins the turbine wheel end of the shaft and the shaft end of the turbine wheel and where the weld joint includes an inner radial border and an outer radial border; a reservoir disposed radially inwardly of the inner radial border of the weld joint; and a solidified portion of the weld pool disposed in the reservoir. In such an example, the reservoir may be referred to as a weld pool spill over reservoir.

Figure 6:
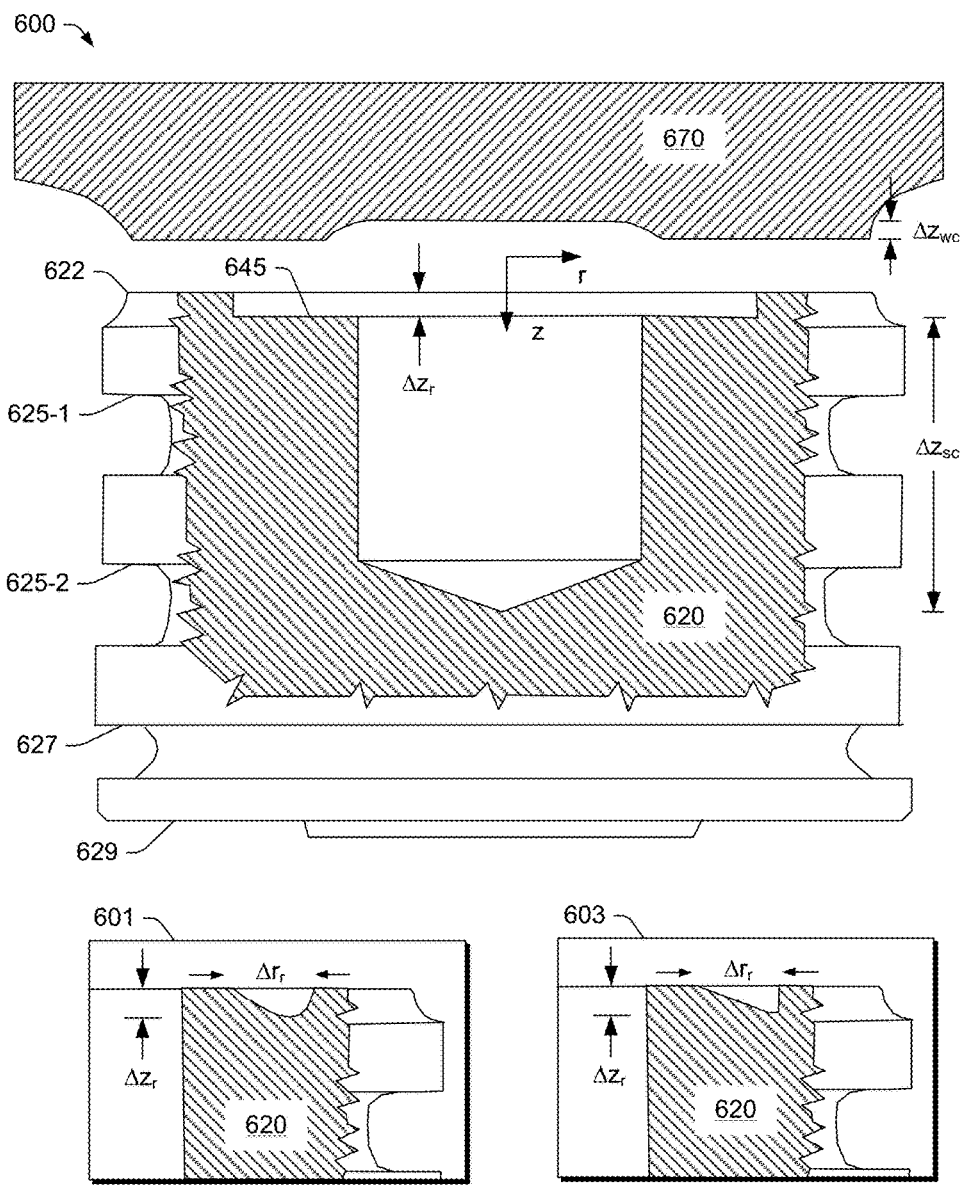
FIG. 6 is a series of views of an example of a shaft and wheel assembly for a turbocharger.

FIG. 6 shows an example of a portion of a shaft and wheel assembly (SWA) 600 that includes a shaft 620 and a turbine wheel 670. The shaft 620 includes a turbine wheel end 622, annular grooves 625-1 and 625-2, shoulders 627 and 629 and a reservoir 645. The reservoir 645 has an annular shape with an inner edge and an outer edge where the reservoir 645 is open to a cavity at its inner edge. The reservoir 645 includes an axial depth $\Delta z_r$. The volume of the reservoir 645 may be determined based on a radius or diameter of its inner edge, a radius or diameter of its outer edge and its axial depth.

FIG. 6 shows additional examples of reservoir profiles 601 and 603. The example profile 601 includes a semi-teardrop shape, for example, where a maximum depth of the profile 601 is closer to the outer edge of the reservoir than the inner edge of the reservoir. As shown, the profile may be smooth, for example, curved. As an example, a reservoir may include a piriform profile (e.g., $x=a*(1+\sin t)$; $y=b*\cos t(1+\sin t)$, for $t$ within 0 degrees to 180 degrees), for example, a semi-piriform profile. As an example, a reservoir may include a pear-shaped profile (e.g., $b^2*y^2=x^3*(a-x)$), for example, a semi-pear-shaped profile. As to a teardrop profile, consider the parameteric equations $x=\cos t$; $y=\sin t*\sin^m (0.5*t)$ where m may be in a range from about 0 to about 7. As an example, a reservoir may include a profile of a portion of a dumbbell curve (e.g., $a^4*y^2=x^4*(a^2-x^2)$). As shown in FIG. 6, the reservoir profile 603 includes lines and corners formed by intersections of two lines. The reservoir profile 603 includes a level floor portion at a maximum depth that extends to the inner edge via a line with a slope. As an example, a reservoir profile may include lines and curves.

Figure 7:
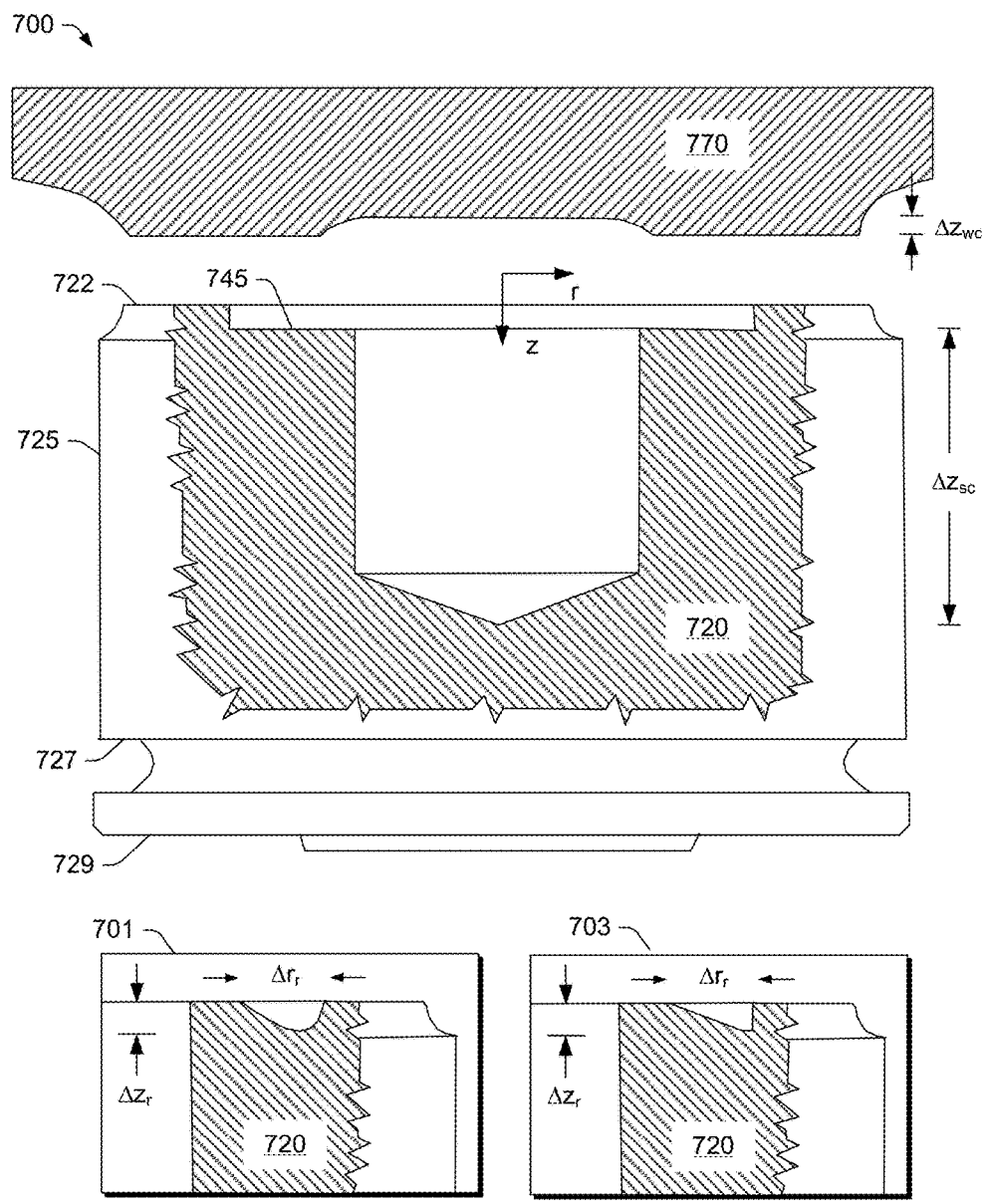
FIG. 7 is a series of views of an example of a shaft and wheel assembly for a turbocharger.

FIG. 7 shows an example of a portion of a shaft and wheel assembly (SWA) 700 that includes a shaft 720 and a turbine wheel 770. The shaft 720 includes a turbine wheel end 722, a side wall 725 (e.g., disposed at a radius), shoulders 727 and 729 and a reservoir 745. The reservoir 745 has an annular shape with an inner edge and an outer edge where the reservoir 745 is open to a cavity at its inner edge. The reservoir 645 includes an axial depth $\Delta z_r$. The volume of the reservoir 745 may be determined based on a radius or diameter of its inner edge, a radius or diameter of its outer edge and its axial depth.

FIG. 7 shows additional examples of reservoir profiles 701 and 703. The example profile 701 includes a semi-teardrop shape, for example, where a maximum depth of the profile 701 is closer to the outer edge of the reservoir than the inner edge of the reservoir. As shown, the profile may be smooth, for example, curved. As an example, a reservoir may include a piriform profile (e.g., $x=a*(1+\sin t)$; $y=b*\cos t(1+\sin t)$, for t within 0 degrees to 180 degrees), for example, a semi-piriform profile. As an example, a reservoir may include a pear-shaped profile (e.g., $b^2*y^2=x^3*(a-x)$), for example, a semi-pear-shaped profile. As to a teardrop profile, consider the parameteric equations $x=\cos t$; $y=\sin t*\sin^m (0.5*t)$ where m may be in a range from about 0 to about 7. As an example, a reservoir may include a profile of a portion of a dumbbell curve (e.g., $a^4*y^2=x^4*(a^2-x^2)$). As shown in FIG. 7, the reservoir profile 703 includes lines and corners formed by intersections of two lines. The reservoir profile 703 includes a level floor portion at a maximum depth that extends to the inner edge via a line with a slope. As an example, a reservoir profile may include lines and curves.

Figure 8:
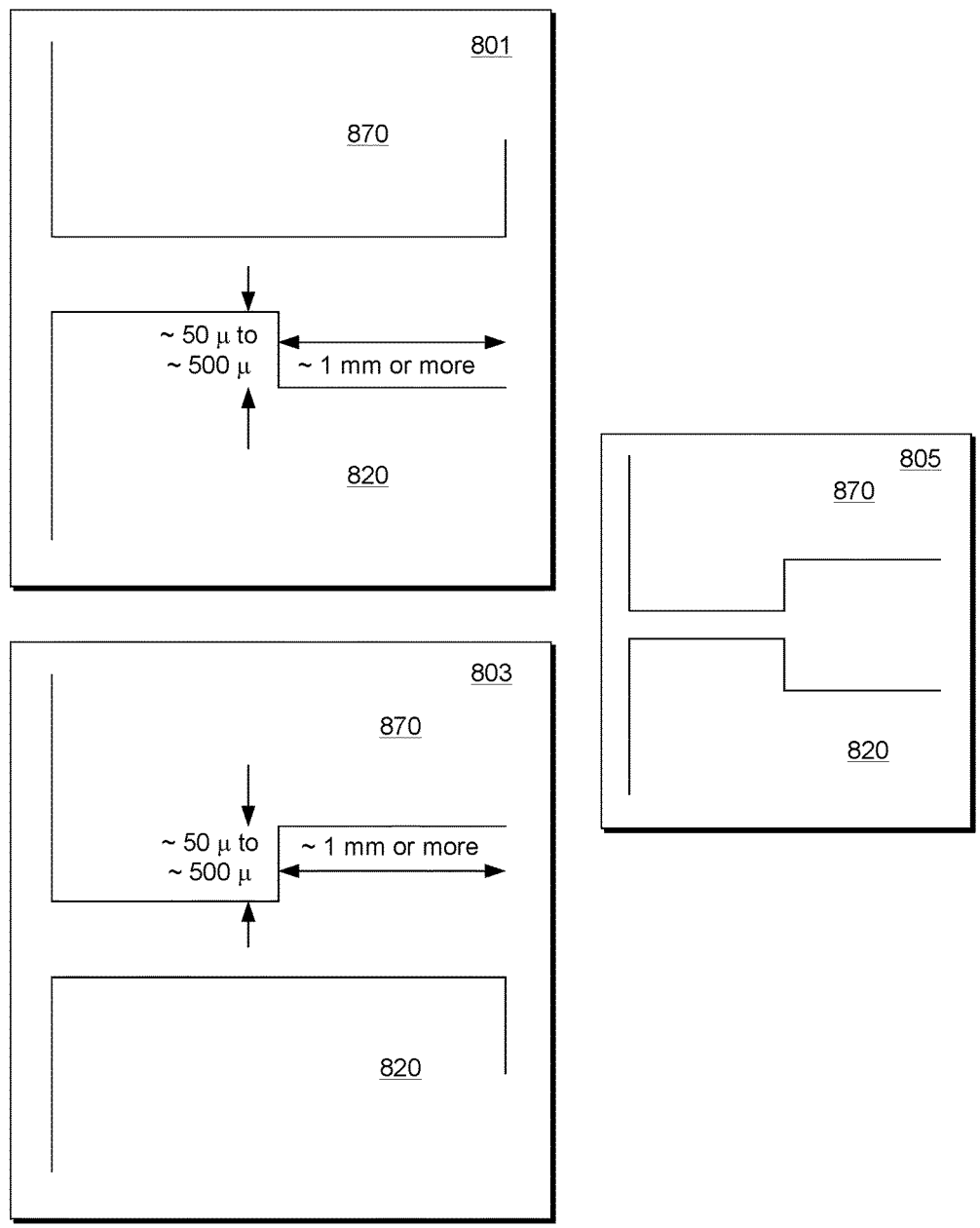
FIG. 8 is a series of views of examples of shafts and turbine wheels.

FIG. 8 shows example arrangements 801, 803 and 805 for a shaft 820 and a turbine wheel 870. In these examples, various dimensions are shown, as examples, for features that may define, at least in part, a reservoir. For example, an axial dimension or axial depth of a reservoir may be in a range from about 50 microns to about 500 microns while a radial dimension of a reservoir may be about 1000 microns (e.g., about 1 mm) or more (e.g., and may extend radially inwardly to a central cavity, etc.). As an example, a shaft and/or a turbine wheel may include steel, nickel or other material that when subject to an energy beam melt. As an example, during manufacture of a shaft and wheel assembly (SWA), energy from a beam or beams may be directed to a joint between a turbine wheel end of a shaft and a shaft end of a turbine wheel such that material from at least one of the shaft and the turbine wheel melts. Where molten material flows radially inwardly, a reservoir may accommodate at least a portion of the molten material. In such an example, the reservoir may help to alleviate stress and may help to form a SWA with suitable integrity and balance or balancability.

Figure 9:
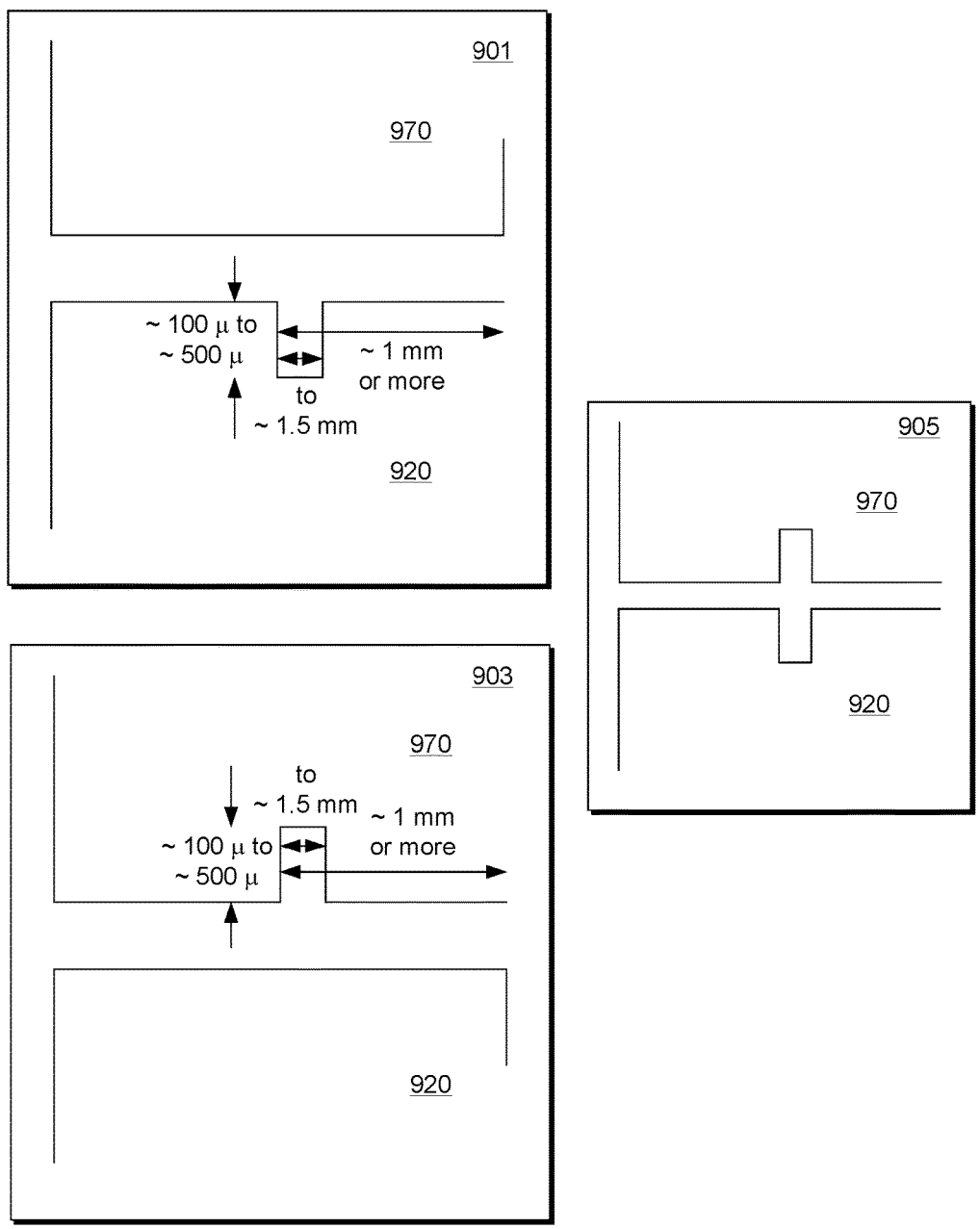
FIG. 9 is a series of views of examples of shafts and turbine wheels.

FIG. 9 shows example arrangements 901, 903 and 905 for a shaft 920 and a turbine wheel 970. In these examples, various dimensions are shown, as examples, for features that can define, at least in part, a reservoir. For example, an axial dimension or axial depth of a reservoir may be in a range from about 100 microns to about 500 microns while a radial dimension of a reservoir may be up to about 1500 microns (e.g., about 1.5 mm). Further, an outer edge of a reservoir may be disposed at least about 1 mm from an edge of a cavity (e.g., a central cavity of a shaft and/or a central cavity of a turbine wheel). As an example, a shaft and/or a turbine wheel may include steel, nickel or other material that when subject to an energy beam melt. As an example, during manufacture of a shaft and wheel assembly (SWA), energy from a beam or beams may be directed to a joint between a turbine wheel end of a shaft and a shaft end of a turbine wheel such that material from at least one of the shaft and the turbine wheel melts. Where molten material flows radially inwardly, a reservoir may accommodate at least a portion of the molten material. In such an example, the reservoir may help to alleviate stress and may help to form a SWA with suitable integrity and balance or balancability.

As an example, a filler material may be disposed between a shaft and a turbine wheel prior to welding. For example, a filler material may include a metal such as nickel. As an example, a filler material may be a nickel-based or nickel-rich filler material. As an example, a filler material may include one or more of Ag, Cr, Si, B, Ni, Pd, Ti and Fe. As an example, a filler material may include nickel (Ni) as a largest percentage by weight (e.g., consider a filler material that includes Ni at greater than about 40 percent by weight). As an example, a filler material may, when subject to a welding beam, behave (e.g., at least in part) as a brazing material. For example, phenomena that occur during welding in the presence of a filler material may include brazing phenomena. As an example, a phenomenon may be diffusion, for example, where one or more constituents diffuse in a material and/or with respect to another material. As an example, a process may include crystallization, for example, where a material or materials may recrystallize or, for example, where a material with a composition (e.g., or phase, phases, etc.) that differs from that of one or more of a starting material crystallizes. As an example, a filler material may provide for a welded joint between a shaft and a turbine wheel that has acceptable stresses, for example, for an intended purpose (e.g., turbocharger specifications, engine specifications, vehicle specifications, etc.). As an example, a welded joint may be a joint that is at least in part welded.

As an example, a welding process may include forming a weld pool that includes a material of a turbine wheel and a filler material. As an example, a welding process may include forming a weld pool that includes a material of a shaft, for example, in addition to one or more other materials. As an example, a welding process may deliver energy that raises a temperature of materials at a joint above melt temperatures for at least one of the materials. As an example, such a temperature may be in excess of about 450 degrees C. As an example, such a temperature may be in excess of about 900 degrees C. As an example, a target temperature may depend on one or more of a material of a shaft, a material of a turbine wheel and material of a filler material.

As an example, a filler material may be in one or more forms. For example, filler material may be provided as a solid or, for example, as a paste. As an example, a filler material may be provided as a ring (e.g., an annular piece that is made of or includes filler material). As an example, a filler material may be disposed (e.g., as least partially) in a reservoir. As an example, a filler material may be disposed at an interface between a shaft and a turbine wheel. As an example, during a welding process, the axial positions of a shaft and a turbine wheel may change. For example, the shaft and the turbine wheel may become closer, for example, where filler material that may be disposed between the shaft and the turbine wheel melts and/or where a material of a shaft melts and/or where a material of a turbine wheel melts. As an example, an overall axial length of a shaft and turbine wheel may change during a welding process (e.g., as some material may flow to a reservoir, etc.).

As an example, a filler material may aid in weld pool formation. For example, a filler material may provide for particular weld pool characteristics during a welding process (e.g., volume of weld pool, distribution of weld pool, flow of weld pool, etc.). As an example, a method may include disposing filler material between a shaft and a turbine wheel and welding the shaft to the turbine wheel. As an example, a filler material may provide for a desired joint profile (e.g., as may be visualized via non-destructive measurements, etc.). As an example, a welding beam may be directed toward a shaft side or toward a turbine wheel side. As an example, a welding process may direct a welding beam toward a turbine wheel side of a joint formed by a shaft and a turbine wheel (e.g., to impinge material of a turbine wheel axially above the joint). In such an example, filler material may, after welding, provide a desirable joint profile for a shaft and wheel assembly (SWA).

Figure 10:
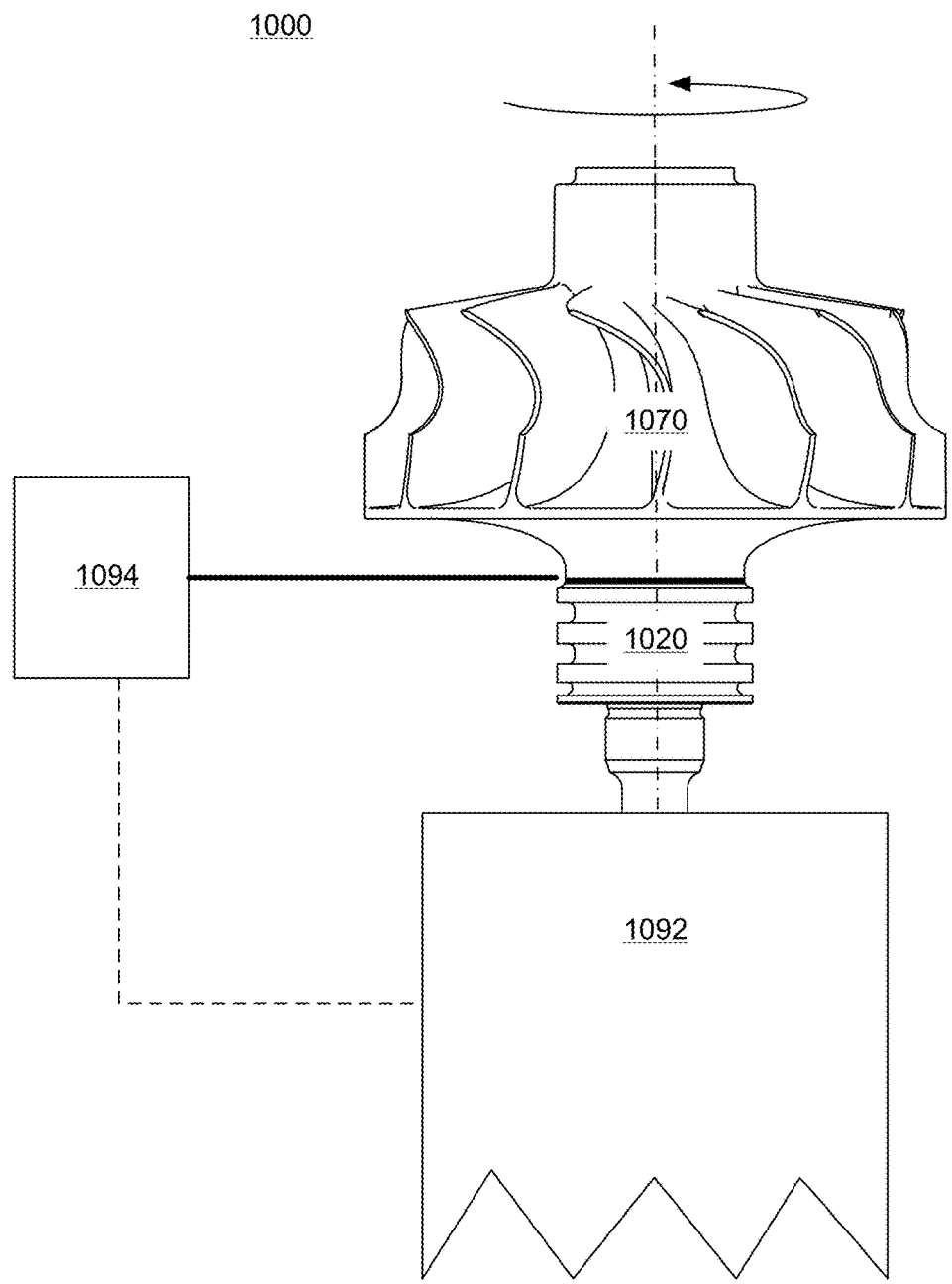
FIG. 10 is a diagram of an example of a system for forming a shaft and wheel assembly via a welding process.

FIG. 10 shows an example of a system 1000 that includes a tool 1092 and a welder 1094. As an example, the tool 1092 may be configured to rotate a shaft 1020 and a turbine wheel 1070 and optionally control emissions of energy from the welder 1094, which may be a beam welder (e.g., an electron beam welder, a laser beam welder, etc.). As an example, multiple welders may be provided. As an example, the system 1000 may for a weld joint that joins the shaft 1020 and the turbine wheel 1070 (see, e.g., the weld joint 550 of FIG. 5). As an example, the shaft 1020 and/or the turbine wheel 1070 may include features that define a reservoir that can receive molten material, the material molten at least in part by energy emitted by the welder 1094. As an example, the system 1000 may perform a process in an environment where, for example, the atmosphere is controlled. As an example, a controlled atmosphere environment may include an inert gas environment, a vacuum environment or other type of environment. As an example, an environment may be controlled to avoid interactions between a welder and constituents in the environment (e.g., consider interactions between a beam and moisture, a beam and oxygen, etc.).

As an example, laser beam welding may employ a laser unit with a power rating of the order of hundreds of watts. As an example, laser beam welding may be implemented with a desired power density. As an example, laser beam welding may use a power density of the order of about 1 MW/cm$^2$ (e.g., depending on power rating, beam size, etc.). As an example, laser beam welding may operate with a beam spot size, for example, consider a beam spot size in a range from about 0.2 mm to about 10 mm (e.g., given as longest spot dimension). As an example, a focal point of a laser beam may be positioned, for example, to be slightly inward from an outer surface (e.g., of a shaft, a turbine wheel, filler material, etc.). As an example, a laser welding process may implement a continuous and/or a pulsed laser beam (e.g., or beams).

Figure 11:
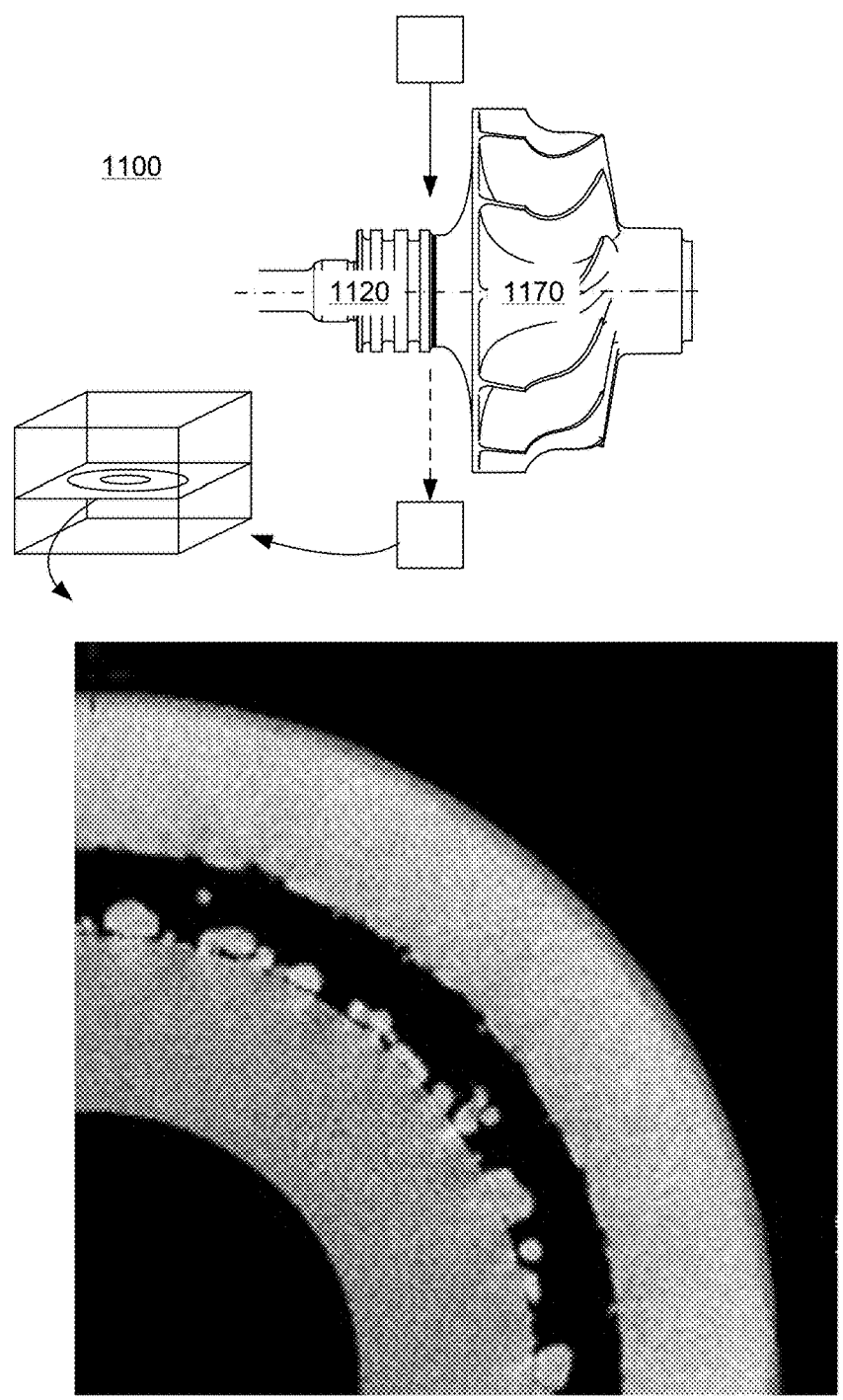
FIG. 11 is a diagram of an example of a system for performing non-destructive measurements and an example of an image that includes a weld joint.

FIG. 11 shows an example of a system 1100 for non-destructive measurements. For example, the system 1100 may include equipment to perform tomography. As an example, one or more aspects of a SWA may be measured using the system 1100. As an example, a portion of a tomographic image is shown for a weld joint of a SWA. As an example, a reservoir that provides for receipt of melt run-over from a welding process may help to reduce stresses during a welding process where energy is delivered to melt material and/or after a welding process where molten material solidifies.

As an example, a method may be described with respect to functional blocks. For example, a method may commence in a provision block for providing a shaft and/or a turbine wheel with a reservoir. Such a method may include a position block for positioning the shaft and the turbine wheel (e.g., for alignment). Such a method may include a weld block for welding the shaft and the wheel to form a shaft and turbine wheel assembly where the reservoir receives at least some molten material (e.g., molten by the welding). A method may include a position block for positioning one or more seal components with respect to a groove (e.g., positioning a piston ring at least partially in the groove). As part of a turbocharger assembly process or optionally a balancing process, a method may include an insertion block for inserting the shaft and turbine wheel assembly with the one or more seal components into a bore of a housing. As described herein, one or more bearing components may be positioned with respect to the shaft of the shaft and turbine wheel assembly prior to inserting into a bore or, for example, for clamping the shaft and turbine wheel assembly in a balancing machine.

As described herein, a shaft and turbine wheel assembly (SWA) can be part of a turbocharger. A method can include operating such a turbocharger. Such a turbocharger may be may be suited for various operational temperature ranges. In some instances, a high temperature diesel engine may have an operational temperature range that overlaps with a gasoline engine. Typical diesel exhaust may vary from about 100 degrees C. at idle to about 500 degrees C. at high load. For a gasoline engine, exhaust temperature may, at an upper end, exceed 1000 degrees C.

Figure 12:
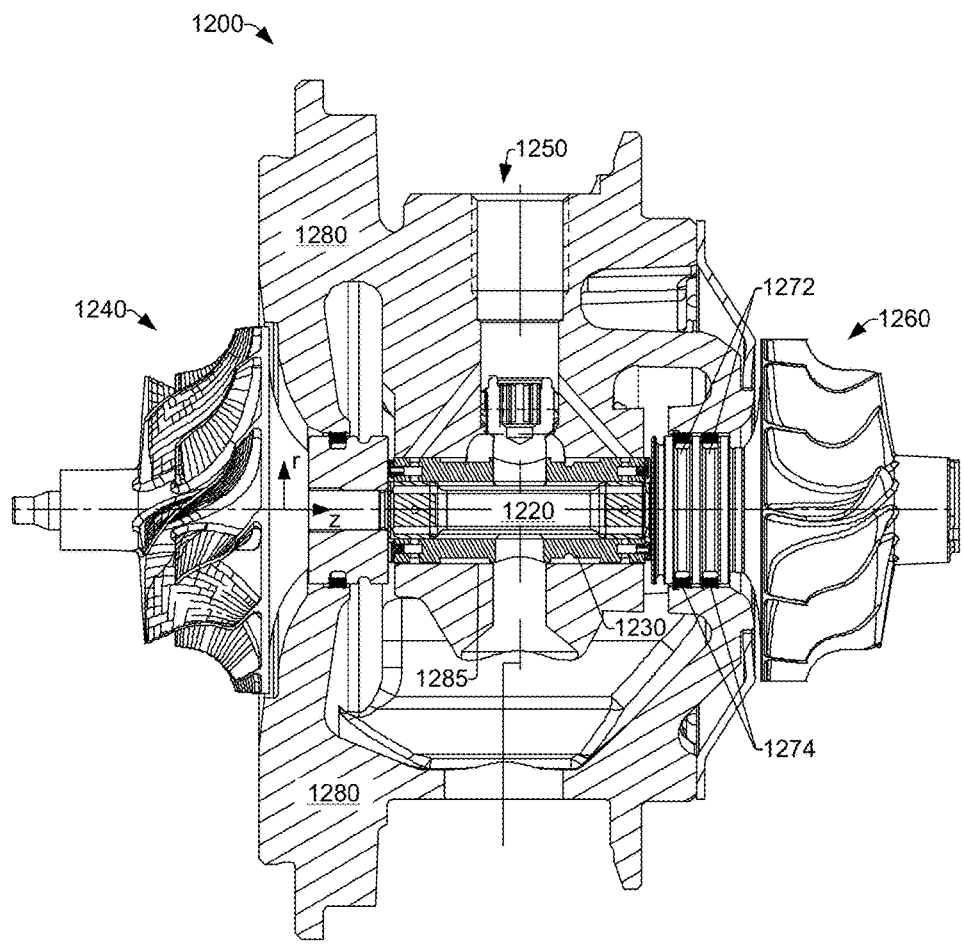
FIG. 12 is a cross-sectional view of a turbocharger.

FIG. 12 shows a cross-sectional view of a turbocharger 1200 with respect to a radial coordinate r and an axial coordinate z. The turbocharger 1200 includes a shaft 1220 supported by a bearing 1230 positioned in a bore 1285 of a center housing 1280. In the example of FIG. 12, the shaft 1220 and a turbine wheel 1260 are joined to form a SWA. The shaft 1220 extends through the bore 1285 of the center housing 1280 to receive a compressor wheel 1240 such that the shaft 1220 may be characterized by a compressor end and a turbine end.

As shown in the example of FIG. 12, the SWA may include one or more grooves 1272 where each groove may be configured to receive a respective seal component 1274, which may be a piston ring or other type of seal component. The turbocharger 1200 includes lubricant passages 1250 for supply of lubricant to at least the shaft 1220 as supported by the bearing 1230. In such a configuration, on one side, the grooves 1272 and the seal components 1274 act to impede flow of lubricant outwardly toward the turbine wheel 1260 and, on an opposing side, the grooves 1272 and the seal components 1274 act to impede flow of exhaust inwardly toward the bearing 1230.

As an example, turbocharger temperature variations and centrifugal loading can affect a SWA, particularly at a joint that joins a shaft to a turbine wheel. For example, where a weld stresses material at or around the weld, temperature variations, centrifugal loading and other forces may causes such stresses to deform a SWA, which can alter balance. As an example, a reservoir may be provided at a joint between a shaft and a turbine wheel that can accept molten material during a welding process where, by accepting such molten material, a resulting weld joint may be formed with a reduced stress zone (e.g., or one or more other beneficial properties, characteristics, etc.). In such an example, the reservoir may be an annular reservoir, optionally with an open side, for example, that opens to a cavity or cavities.

During turbocharger manufacture, balancing may occur for one or more individual components, one or more component assemblies (e.g., a SWA) or a combination of both. For example, consider a center housing rotating assembly (CHRA) that includes a SWA and a compressor wheel supported in a center housing by a bearing. In such an example, component balancing of the SWA and the compressor wheel may occur followed by assembly of the CHRA and assembly balancing of the CHRA. As an example, a reservoir at a joint between a shaft and a turbine wheel that can accept molten material during a welding process may provide for a SWA with suitable balance (e.g., acceptable amount of unbalance), improved balancability, etc.

With respect to commercially available balancing units for turbocharger assemblies, the company Schenck RoTec GmbH (Darmstadt, Germany) markets various balancing machines for turbocharger core assemblies (e.g., horizontal balancing machines such as MBRS series). Such balancing machines operate at low-speed for acquiring dynamic unbalance measurements of a turbocharger core assembly, for example, prior to high-speed balancing of a core assembly. Balancing can be time consuming and add considerable cost. Where a risk exists for deformation of a SWA in an installed turbocharger, benefits achieved by balancing are likely to be diminished. Accordingly, as described herein, various example SWAs aim to have reduced deformation risk. In such examples, reduced deformation risk can be achieved, at least in part, by a reservoir formed via features of a shaft, a turbine wheel or a shaft and a turbine wheel.

As an example, a component for a turbocharger can include a shaft made of a first material where the shaft includes a turbine wheel end and a shaft axis; a turbine wheel made of a second material where the turbine wheel includes a shaft end and a turbine wheel axis; a weld joint formed by solidification of at least a portion of a weld pool that includes the first material and the second material, where the weld joint joins the turbine wheel end of the shaft and the shaft end of the turbine wheel and where the weld joint includes an inner radial border and an outer radial border; a reservoir disposed radially inwardly of the inner radial border of the weld joint; and a solidified portion of the weld pool disposed in the reservoir.

As an example, for an SWA, a shaft axis of a shaft and a turbine wheel axis of a turbine wheel may align.

As an example, reservoir may include an annular cross-section.

As an example, a shaft may include a central cavity that extends axially inwardly from a turbine wheel end of the shaft along a shaft axis. As an example, a turbine wheel can include a central cavity that extends axially inwardly from a shaft end of the turbine wheel along a turbine wheel axis.

As an example, a first material and a second material may differ. For example, a shaft may be made of a material that differs from that of a turbine wheel. As an example, a difference may be in a chemical constituent, a phase, a structure, etc.

As an example, a reservoir may include a curved cross-sectional profile and/or a linear cross-sectional profile.

As an example, a reservoir may include a maximum axial depth in a range from approximately 50 microns to approximately 500 microns. As an example, a reservoir may include a maximum axial depth less than approximately 1 mm.

As an example, a reservoir may include a closed side and an open side, for example, where the open side opens to a cavity. In such an example, the cavity may have a volume that exceeds a volume of the reservoir.

As an example, a component may include a weld pool that includes a filler material. As an example, a filler material may include nickel.

As an example, an assembly can include a shaft that includes a shaft axis and a turbine wheel end that includes an annular weld joint face and a weld pool spill over reservoir radially inward and adjacent to the annular weld joint face; and a turbine wheel that includes a turbine wheel axis and a shaft end that includes a weld joint face. In such an example, the shaft end of the turbine wheel may include a weld pool spill over reservoir radially inward and adjacent to the weld joint face.

As an example, a weld pool spill over reservoir may include a curved cross-sectional profile and/or a linear cross-sectional profile.

As an example, an assembly can include a turbine wheel that includes a turbine wheel axis and a shaft end that includes an annular weld joint face and a weld pool spill over reservoir radially inward and adjacent to the annular weld joint face; and a shaft that includes a shaft axis and a turbine wheel end that includes a weld joint face. In such an example, the turbine wheel end of the shaft may include a weld pool spill over reservoir radially inward and adjacent to the weld joint face.

As an example, a weld pool spill over reservoir may include a curved cross-sectional profile and/or a linear cross-sectional profile.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions without departing from the spirit set forth and defined by the following claims.

What is claimed is:

1. A component for a turbocharger comprising:
   a shaft made of a first material wherein the shaft comprises a turbine wheel end and a shaft axis, wherein the turbine wheel end comprises an outer edge, an annular reservoir with a cross-sectional profile and a first axial depth, a central cavity with a second axial depth that exceeds the first axial depth, a first annular face that extends between the outer edge and the annular reservoir and a second annular face that extends from the central cavity to the annular reservoir wherein an axial position of the first annular face differs from an axial position of the second annular face;
   a turbine wheel made of a second material wherein the turbine wheel comprises a shaft end and a turbine wheel axis, wherein the shaft end comprises an outer edge, a central cavity and an annular face that extends from the central cavity to the outer edge, wherein in an unwelded and contacting state of the annular face of the shaft end of the turbine wheel and the first annular face of the turbine wheel end of the shaft, an axial gap exists that extends diametrically across an inner perimeter of the first annular face of the turbine wheel end of the shaft wherein the axial gap is defined in part by the annular face of the shaft end of the turbine wheel and the second annular face of the turbine wheel end of the shaft;

a weld joint formed by solidification of at least a portion of a weld pool, wherein the weld joint comprises the first material of at least a portion of the first annular face of the shaft and the second material of at least a portion of the annular face of the turbine wheel, wherein the weld joint joins the turbine wheel end of the shaft and the shaft end of the turbine wheel, wherein a portion of the axial gap exists between the second annular face of the shaft and the annular face of the turbine wheel to define, in part, a reservoir overflow volume, and wherein the weld joint determines the axial and radial welded positions of the shaft and the turbine wheel without positional interference between surfaces that are located radially inwardly from the annular reservoir; and a solidified portion of the weld pool disposed in the annular reservoir.

2. The component of claim 1 wherein the shaft axis and the turbine wheel axis align.

3. The component of claim 1 wherein the first material and the second material differ.

4. The component of claim 1 wherein the annular reservoir comprises a maximum axial depth in range from approximately 50 microns to approximately 500 microns.

5. The component of claim 1 wherein the annular reservoir comprises a maximum axial depth less than approximately 1 mm.

6. The component of claim 1 wherein the annular reservoir comprises a closed side and an open side wherein the open side opens to the axial gap that opens to the central cavity of the shaft.

7. The component of claim 6 wherein the central cavity of the shaft comprises a volume that exceeds a volume of the annular reservoir.

8. The component of claim 1 wherein the weld pool comprises a filler material.

9. The component of claim 8 wherein the filler material comprises nickel.

10. An assembly for a turbocharger comprising:

a shaft that comprises a shaft axis and a turbine wheel end, wherein the turbine wheel end comprises an outer edge, an annular reservoir with a cross-sectional profile and a first axial depth, a central cavity with a second axial depth that exceeds the first axial depth, a first annular face that extends between the outer edge and the annular reservoir and a second annular face that extends from the central cavity to the annular reservoir wherein an axial position of the first annular face differs from an axial position of the second annular face; and a turbine wheel that comprises a turbine wheel axis and a shaft end, wherein the shaft end comprises an outer edge, a central cavity and an annular face that extends from the central cavity to the outer edge, wherein in an unwelded and contacting state of the annular face of the shaft end of the turbine wheel and the first annular face of the turbine wheel end of the shaft, an axial gap exists that extends diametrically across an inner perimeter of the first annular face of the turbine wheel end of the shaft wherein the axial gap is defined in part by the annular face of the shaft end of the turbine wheel and the second annular face of the turbine wheel end of the shaft, wherein, upon welding, a weld joint forms at the outer edges of the shaft and the turbine wheel, extends radially inwardly and determines the axial and radial welded positions of the shaft and the turbine wheel without positional interference between surfaces that are located radially inwardly from the annular reservoir, and wherein a portion of the axial gap formed between the second annular face of the shaft and the annular face of the turbine wheel defines, in part, a reservoir overflow volume.

11. The assembly of claim 10 wherein the cross-sectional profile of the annular reservoir comprises one or more of a curved cross-sectional profile and a linear cross-sectional profile.

12. The component of claim 1 wherein the cross-sectional profile of the annular reservoir comprises a curved cross-sectional profile.

13. The component of claim 1 wherein the cross-sectional profile of the annular reservoir comprises a linear cross-sectional profile.

14. The component of claim 1 wherein the cross-sectional profile of the annular reservoir comprises one or more of a curved cross-sectional profile and a linear cross-sectional profile.

* * * * *